(12) United States Patent
Li et al.

(10) Patent No.: US 10,534,544 B2
(45) Date of Patent: Jan. 14, 2020

(54) DATA SHUFFLING IN A NON-UNIFORM MEMORY ACCESS DEVICE

(71) Applicant: International Business Machines Corporation, Armonk, NY (US)

(72) Inventors: Yinan Li, Madison, WI (US); Guy M. Lohman, San Jose, CA (US); Rene Mueller, San Jose, CA (US); Ippokratis Pandis, Palo Alto, CA (US); Vijayshankar Raman, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

(21) Appl. No.: 15/828,465

(22) Filed: Dec. 1, 2017

(65) Prior Publication Data

US 2018/0088830 A1 Mar. 29, 2018

Related U.S. Application Data

(63) Continuation of application No. 14/944,285, filed on Nov. 18, 2015, now Pat. No. 9,952,777, which is a
(Continued)

(51) Int. Cl.
*G06F 9/46* (2006.01)
*G06F 3/06* (2006.01)
(Continued)

(52) U.S. Cl.
CPC .......... *G06F 3/0611* (2013.01); *G06F 3/0644* (2013.01); *G06F 3/0685* (2013.01);
(Continued)

(58) Field of Classification Search
CPC .... G06F 3/0611; G06F 3/0644; G06F 3/0685; G06F 9/50; G06F 9/5077; G06F 9/54
(Continued)

(56) References Cited

U.S. PATENT DOCUMENTS 5,440,706 A 8/1995 Juri et al.
6,026,461 A 2/2000 Baxter et al.
(Continued)

FOREIGN PATENT DOCUMENTS

EP 0467717 A2 1/1992
EP 0981092 A2 2/2000
JP 2004336341 A 11/2004

OTHER PUBLICATIONS

Albutiu et al., "Massively Parallel Sort-Merge Joins in Main Memory MultiCore Database Systems", PVLDB, 5(10), 2012, pp. 1064-1075.
(Continued)

*Primary Examiner* — Camquy Truong
(74) *Attorney, Agent, or Firm* — Cantor Colburn LLP; Anthony Curro (57) ABSTRACT

A method of orchestrated shuffling of data in a non-uniform memory access device that includes a plurality of processing nodes that are connected by interconnects. The method includes running an application on a plurality of threads executing on the plurality of processing nodes. Data to be shuffled is identified from source threads running on source processing nodes among the processing nodes to target threads executing on target processing nodes among the processing nodes. The method further includes generating a plan for orchestrating the shuffling of the data among the all of the memory devices associated with the threads and for simultaneously transmitting data over different interconnects to a plurality of different target processing nodes from a plurality of different source processing nodes. The data is
(Continued)

shuffled among all of the memory devices based on the plan. The data includes operand data and operational state data of the source threads.

15 Claims, 6 Drawing Sheets

Related U.S. Application Data continuation of application No. 14/147,912, filed on Jan. 6, 2014, now Pat. No. 9,274,835.

(51) Int. Cl.
*G06F 9/50* (2006.01)
*G06F 9/54* (2006.01)

(52) U.S. Cl.
CPC .............. *G06F 9/50* (2013.01); *G06F 9/5077* (2013.01); *G06F 9/54* (2013.01); *G06F 2212/2542* (2013.01)

(58) Field of Classification Search
USPC ........................................................ 718/105
See application file for complete search history.

(56) References Cited

U.S. PATENT DOCUMENTS

| | | | |
|---|---|---|---|
| 6,067,603 | A | 5/2000 | Carpenter et al. |
| 6,081,874 | A | 6/2000 | Carpenter et al. |
| 6,085,293 | A | 7/2000 | Carpenter et al. |
| 6,349,394 | B1 | 2/2002 | Brock et al. |
| 6,658,538 | B2 | 12/2003 | Arimilli et al. |
| 6,687,756 | B1 | 2/2004 | Rawson, III |
| 7,200,757 | B1 | 4/2007 | Muralidhar et al. |
| 9,405,539 | B2 | 8/2016 | Uliel |
| 2007/0006271 | A1 | 1/2007 | Janus |
| 2012/0072624 | A1 | 3/2012 | Droux et al. |
| 2012/0272047 | A1 | 10/2012 | Macy, Jr. et al. |
| 2013/0080712 | A1 | 3/2013 | Anand et al. |
| 2013/0297888 | A1 | 11/2013 | Yamashita et al. |
| 2015/0039851 | A1* | 2/2015 | Uliel .................. G06F 9/30036 712/4 |
| 2018/0088831 | A1 | 3/2018 | Li et al. |
| 2018/0088832 | A1 | 3/2018 | Li |

OTHER PUBLICATIONS

Lameter, "Effective Synchronization on Linux/NUMA Systems," Gelato Conference, May 20, 2005, pp. 1-23.
Li et al., "NUMA-aware algorithms: the case of data shuffling", 6th Biennial Conference on Innovative Data Systems Research (CIDR'13), Jan. 6-9, 2013, Asilomar, CA, pp. 1-10.
Li et al., "The need for NUMA-aware algorithms: the case of data shuffling", ACM, 2013, pp. 1-8.
Maddox et al., Weaving High Performance Multiprocessor Fabric. Intel Press. 2009, pp. 1-86.
Maddox et al., Weaving High Performance Multiprocessor Fabric. Intel Press. 2009, pp. 197-293.
Maddox et al., Weaving High Performance Multiprocessor Fabric. Intel Press. 2009, pp. 87-196.
Porobic et al., "OLTP on Hardware Islands", PVLDB, 5(11), 2012, pp. 1447-1458.
Schupbach et al., "Embracing diversity in the Barrelfish manycore operating system", In Proceedings of the Workshop on Managed Many-Core Systems, Jun. 24, 2008, pp. 1-9.
Zhang et al., "Accelerating the Data Shuffle Operations for FFT Algorithms on SIMD DSPs," School of Computer, National University of Defense Technology, Changsha, China, IEEE, 2011, 4 pages.
Zhang et al., "Optimizing Data Shuffling in Data-Parallel Computation by Understanding User-Defined Functions", Huazhong University of Science and Technology, Wuhan, 430074, China, 2012, pp. 1-14.

* cited by examiner

FIG. 1

PRIOR ART

DATA SHUFFLING IN A NON-UNIFORM MEMORY ACCESS DEVICE

DOMESTIC PRIORITY

This application is a continuation of U.S. patent application Ser. No. 14/944,285, filed Nov. 18, 2015 which is a continuation of U.S. patent application Ser. No. 14/147,912, filed Jan. 6, 2014 now U.S. Pat. No. 9,274,835, the content of which are incorporated by reference herein in their entirety.

BACKGROUND

The present disclosure relates to memory access devices and, in particular, to data shuffling in non-uniform memory access devices.

Non-uniform memory access (NUMA) architectures have begun to emerge as architectures for improving processor performance, such as in multi-core processors. In a NUMA architecture, each socket or processing node has its own local memory, such as dynamic random access memory (DRAM), and each socket or processing node is connected to the other sockets to allow each socket to access the memory of each other socket. Thus, in NUMA architectures, access latency and bandwidth vary depending on whether a socket is accessing its own local memory or remote memory of another socket or processing node.

SUMMARY

Embodiments of the invention include methods, computer program products, and systems for orchestrated shuffling of data in a non-uniform memory access device that includes a plurality of processing nodes that are connected by interconnects. A method includes running an application on a plurality of threads executing on the plurality of processing nodes. Running the application includes dividing the data on each thread into partitions according to a target thread on which the data is to be processed. The method further includes identifying, by the threads, data to be shuffled from source threads running on source processing nodes among the processing nodes to target threads executing on target processing nodes among the processing nodes. A plan is generated for orchestrating the shuffling of the data among the all of the memory devices associated with the threads and for simultaneously transmitting data over different interconnects to a plurality of different target processing nodes from a plurality of different source processing nodes. The plan includes utilizing a data-shifting table to identify an order in which the data partitions are to be transferred from the source threads to the target threads. The method includes shuffling the data among memory devices associated with the plurality of processing nodes based on the plan by transmitting data partitions from the plurality of source threads to the plurality of target threads according to the data-shifting table and shifting the data-shifting table to associate each source thread with a different target thread according to the data-shifting table. Another set of data partitions is transmitted from the plurality of source threads to the plurality of target threads. The data includes operand data and operational state data of the source threads.

Additional features and advantages are realized through the techniques of the present disclosure. Other embodiments and aspects of the present disclosure are described in detail herein and are considered a part of the claimed disclosure.

For a better understanding of the disclosure with the advantages and the features, refer to the description and to the drawings.

BRIEF DESCRIPTION OF THE DRAWINGS

The subject matter of the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

In systems employing non-uniform memory access architectures, latency and bandwidth vary depending upon whether a processing node is accessing its own local memory or the memory associated with another processing node. Embodiments of the invention improve latency and bandwidth by orchestrated shuffling of data partitions and processing nodes while processing the data partitions.

Figure 1:
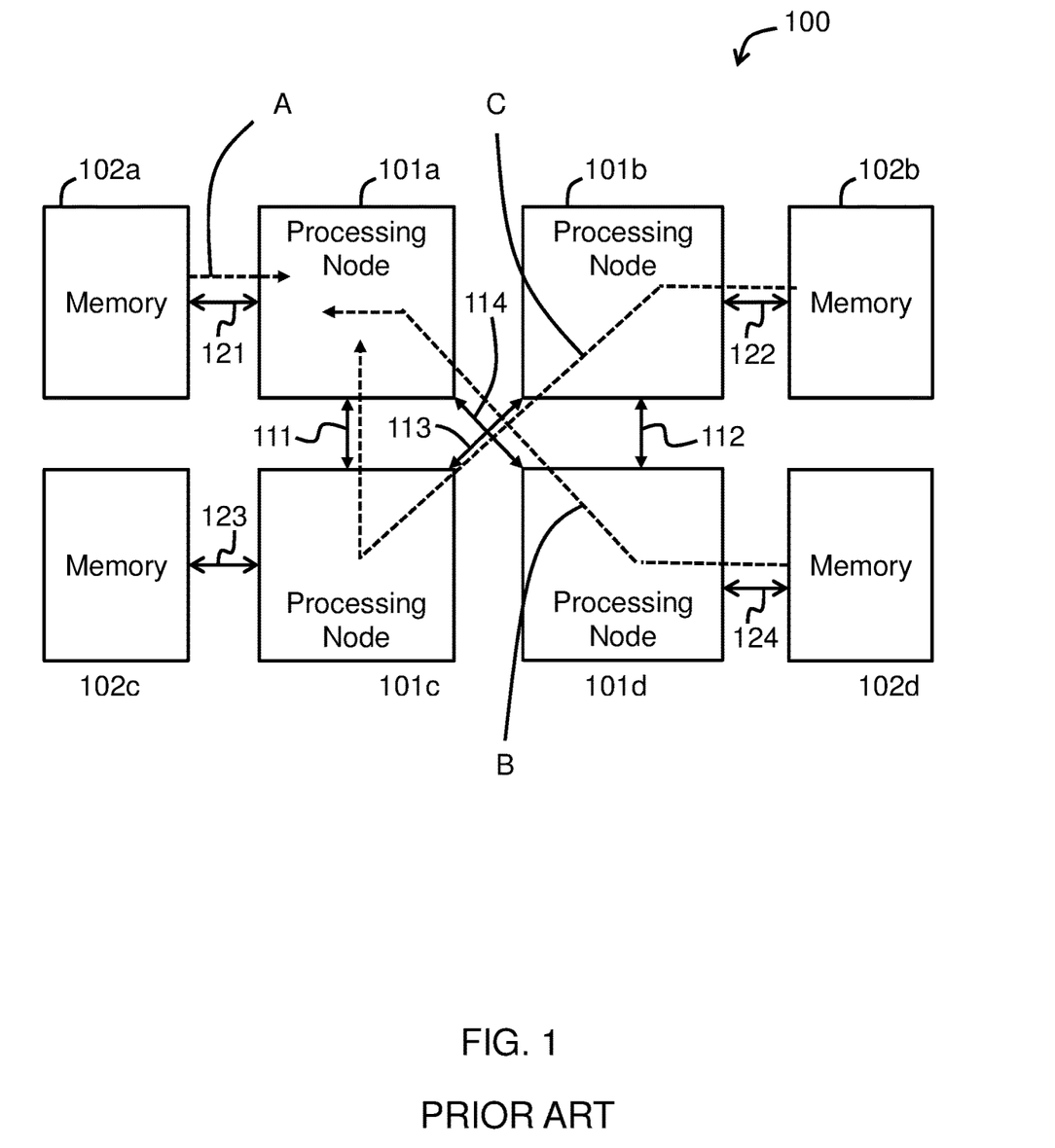
FIG. 1 illustrates a non-uniform memory access system according to an embodiment of the invention.

FIG. 1 illustrates a non-uniform memory access (NUMA) system 100 according to an embodiment of the invention. The system 100 includes processing nodes 101a, 101b, 101c and 101d. In one embodiment, each processing node is a separate processing chip, a separate processor package or a separate processor socket. In another embodiment, at least one of the processing nodes 101a to 101d is a separate processing core than another of the processing nodes 101a to 101d. For example, the processing node 101a may be a processing core on a first processor microchip, the processing node 101b may be a processing core on the same first processor microchip, and the processing node 101d may be a processing core on a separate, second processor microchip.

In the present specification and claims, the NUMA architecture is characterized by local memory 102a to 102d that is directly connected to one of the processing nodes 101a to 101d and indirectly connected to the other processing nodes 101a to 101d via at least one intervening processing node 101a to 101d. During operation, the processing nodes 101a to 101d access data both in local memory 102a to 102d directly connected to the processing nodes 101a to 101d and in local memory 102a to 102d directly connected to other processing nodes 101a to 101d. Since multiple processing nodes 101a to 101d attempt to use the same interconnects simultaneously to access data, data contention occurs on the interconnects.

In the embodiment illustrated in FIG. 1, the processing node 101a is directly connected to local memory 102a via an interconnect 121; the processing node 101b is directly connected to local memory 102b via an interconnect 122; the processing node 101c is directly connected to local memory 102c via an interconnect 123; and the processing node 101d is directly connected to local memory 102d via an interconnect 124. In the present specification and claims, the term "directly connected" means that there is not intervening processing node 101a, although embodiments of the invention encompass other intervening circuitry, such as passive components (resistors, capacitors, etc.) and data processing or filtering elements. Conversely, the term "indirectly connected" means that there is at least one processing node 101a to 101d that is located between the requesting processing node 101a to 101d and the local memory 102a to 102d that stores the data or instructions being accessed.

In the embodiment illustrated in FIG. 1, the processing node 101a is indirectly connected to memory 102b via the intervening processing nodes 101b and 101c. The processing node 101c is connected to the processing node 101a by the interconnect 111, and the processing node 101c is connected to the processing node 101b by the interconnect 113. The processing node 101a is indirectly connected to memory 102c via the intervening processing node 101c; and the processing node 101a is indirectly connected to memory 102d via the intervening processing node 101d, and the processing nodes 101a and 101d are connected via the interconnect 114.

While one configuration of interconnection among local memory 102a to 102d and processing nodes 101a to 101d is illustrated in FIG. 1, embodiments of the invention encompass any configuration of data and control connections among a plurality of local memory and a plurality of processing nodes, where the plurality of processing nodes are directly connected to at least one local memory and indirectly connected to at least one local memory via another of the plurality of processing nodes, according to a NUMA architecture. For example, in an alternative embodiment, the processing nodes 101a and 101b may be connected by an interconnect, and the processing nodes 101c and 101d may be connected by an interconnect. In addition, while FIG. 1 illustrates an example NUMA system having four processing nodes 101a to 101d, embodiments of the invention encompass any number of processing nodes greater than one, such as six, eight, twelve, sixteen, etc.

In operation, each processing node 101a to 101d executes one or more program or instruction threads by accessing the corresponding local memory 102a to 102d. For example, the processing node 101a executes an instruction thread by accessing instructions and data from memory 102a. However, each thread corresponding to the separate local memory 102a to 102c may include instructions and operand data destined for another thread or another processing node 101a to 101d, resulting in data contention on the interconnects and processing nodes 101a to 101d.

For example, data from memory 102a that is destined for a thread executed by the processing node 101a must travel only a distance A via the interconnect 121. Data from memory 102d destined for the thread executed by the processing node 101a must travel a distance B via the interconnect 124, the processing node 101d, and the interconnect 114. Data from memory 102b destined for the thread executed by the processing node 101a must travel a distance C via the interconnect 122, the processing node 101b, the interconnect 113, the processing node 101c, and the interconnect 111. Accordingly, data contention would occur in the processing node 101b and the interconnect 122 when both the processing node 101c and the processing node 101b need to access data in the local memory 102b. Similar data contention occurs in any interconnect and processing node along a path used by multiple processing nodes 101a to 101d to access data from one or more local memory devices 102a to 102d.

In embodiments of the invention, an algorithm is provided to orchestrate the shuffling of data among multiple memory locations and processing nodes, where the processing nodes have non-uniform access times to the multiple memory locations. The shuffling of data is necessary to process the data, and the orchestration of the data shuffling among all of the processing nodes reduces or prevents data contention and improves performance, including memory access times and times necessary to process instructions and data. In addition, the reduction of data contention improves bandwidth in the system 100 by orchestrating the data shuffling among processing nodes, such as instruction threads or processing nodes, rather than merely requesting that data associated with a particular processing node be transmitted to the processing node from the instruction thread or processing node 101a to 101d that originally accesses the data or instructions.

Figure 2:
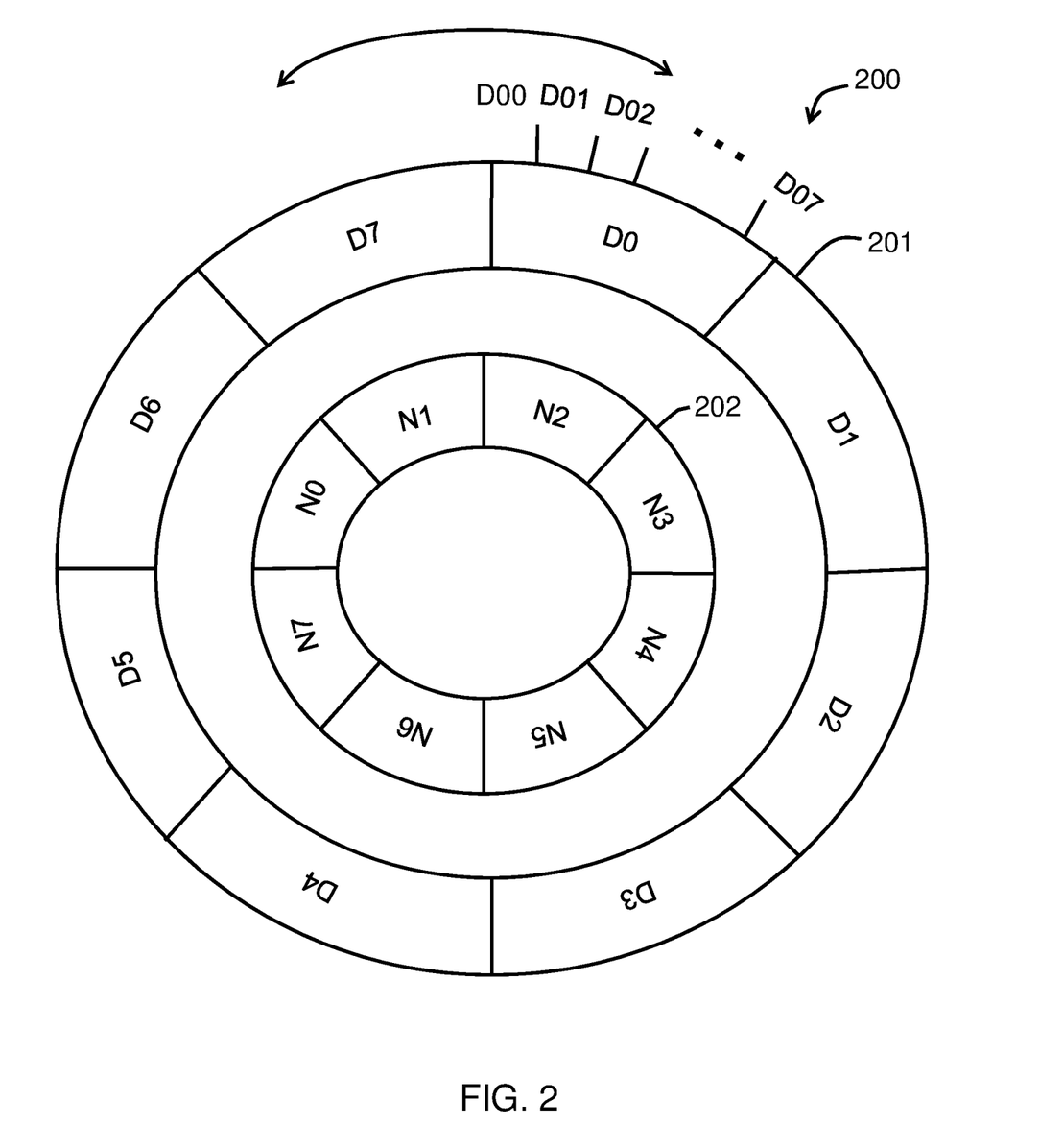
FIG. 2 illustrates an instruction-execution table according to an embodiment of the invention.

FIG. 2 illustrates an instruction-execution table 200 for shuffling data partitions D0 to D7 among processing nodes N0 to N7. In embodiments of the invention, data partitions D0 to D7 may include any segment of instructions and/or operand data of any predefined size. The data partitions D0 to D7 may include any segment of operand data, or non-instruction data. The data partitions D0 to D7 may also include any combination of instructions and non-instruction data or operand data.

Referring to FIG. 2, the instruction-execution table 200 includes an outer ring 201 and an inner ring 202. The outer ring 201 includes multiple data partitions D0 to D7. The data partitions represent data located at different memory devices in a NUMA system. The inner ring 202 includes multiple processing nodes N0 to N7. Each data partition is divided into sub-partitions corresponding to data that designated to be executed at different processing nodes N0 to N7. For example, the data partition D0 is divided into sub-partitions D00 to D07, to be executed on the processing nodes N0 to N7. In other words, the data partition D0 is located in a first memory device directly connected to a processing node N0. The data partition D0 includes sub-partitions D00 to D07 including data to be executed by the processing node N0 and the additional processing nodes N1 to N7.

In operation, each data partition D0 to D7 is associated with a separate processing node N0 to N7. The data of the data partitions D0 to D7 designated to be executed by the associated nodes N0 to N7, represented as being aligned with the data partitions D0 to D7 in FIG. 2, is transmitted to the processing node N0 to N7 associated with the respective processing nodes N0 to N7. Then, the instruction-execution table 200 is shifted to associate each data partition D0 to D7 with a different processing node N0 to N7. For example, in one embodiment, one of the inner ring and the outer ring is shifted by one segment (i.e., the data partition D0 is shifted from N2 to N3, or from N2 to N1). Then, the data of each data partition D0 to D7 designated to be transmitted to the new processing node N0 to N7 is transmitted, and the process of shifting and transmitting is repeated until each data partition D0 to D7 has been associated with each processing node N0 to N7.

As discussed above with reference to FIG. 1, in the course of operation, a thread executing on a processing node and associated with a particular physical memory location may determine that data, including one or both of instructions and non-instruction data or operand data, is associated with another thread or should be processed by another thread that is associated with another processing node. The algorithm represented by the instruction-execution table 200 of FIG. 2 provides a mechanism for orchestrating the shuffling of the data among the different threads and processing nodes by coordinating the data shuffling process among all of the processing nodes. The orchestrated shuffling of FIG. 2 may be performed simultaneously, in lock-step, or loosely, such that each transfer of data from one processing node to another occurs within a predetermined time frame, although not necessarily in lock-step. The orchestration of data transfer reduces or eliminates data contention in the NUMA system.

While the instruction-execution table 200 of FIG. 2 is illustrated as a ring for purposes of clarity in description, it is understood that the ring-shaped instruction-execution table 200 is a visual depiction of an algorithm stored in a memory device. For example, the memory device may store data representing the different data partitions D0 to D7 and data representing the different processing nodes N0 to N7, and a processor may store information regarding the data in each data partition D0 to D7 that is associated with the different processing nodes N0 to N7. The processor may update or change the association of the data partitions D0 to D7 with the processing nodes N0 to N7 in a manner that may be represented by the instruction-execution table 200 of FIG. 2.

Figure 3:
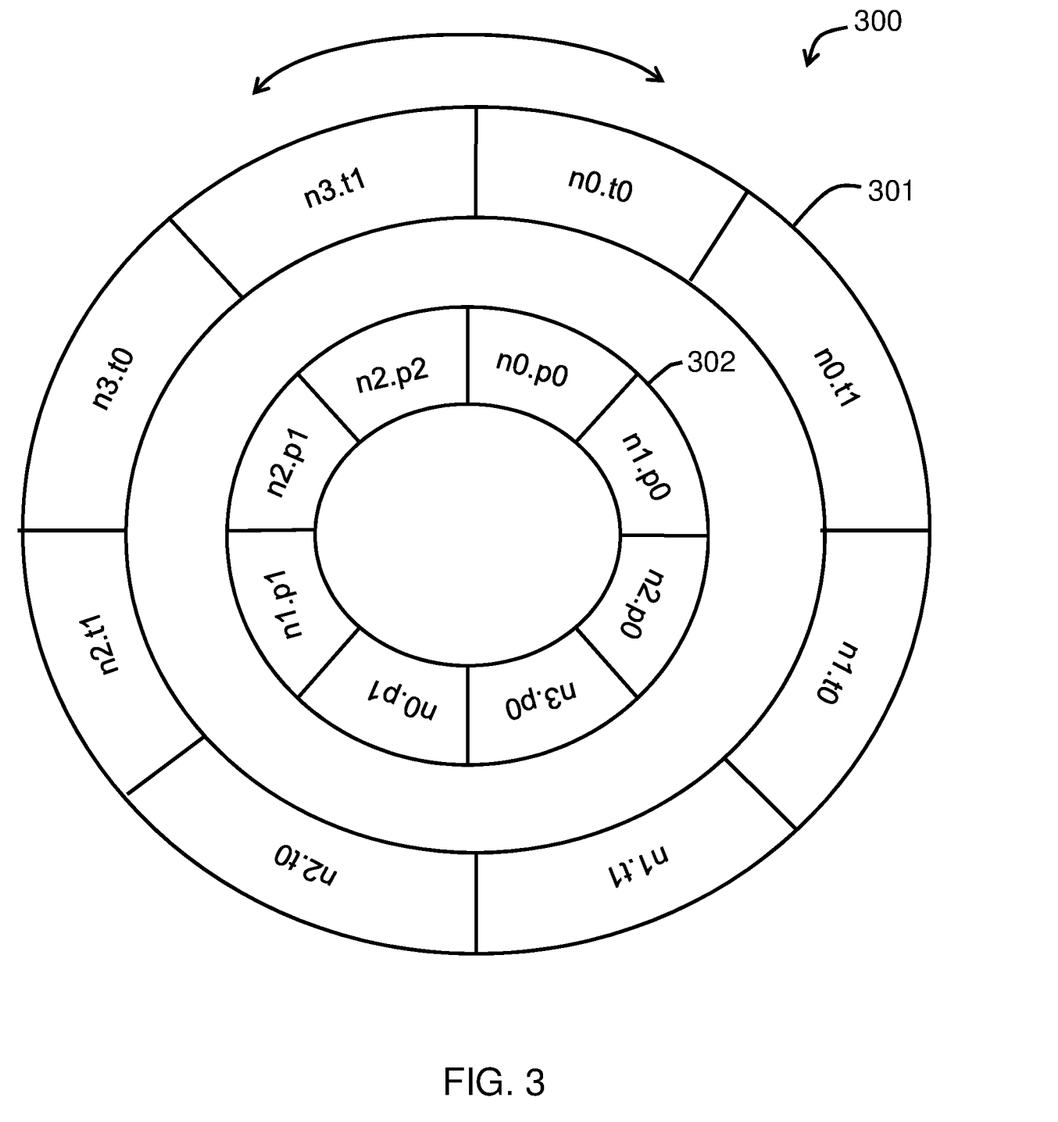
FIG. 3 illustrates an instruction-execution table according to one embodiment.

FIG. 3 illustrates an instruction execution table 300 according to one embodiment, in which the data partitions correspond to data and the processing nodes correspond to particular threads running on particular processing nodes made up of processing circuitry. In the embodiment illustrated in FIG. 3, an outer ring 301 includes segments representing particular threads running on particular processing nodes. For example, n0.t0 represents thread 0 executed by processing node 0 and n0.t1 represents a thread 1 executed by the processing node 0. As illustrated by this figure, in some embodiments, a single socket or processing node executes multiple instruction threads, and in other embodiments each socket or processing node executes only one instruction thread.

The instruction execution table 300 also includes an inner ring 302 including segments representing different data partitions, where each data partition is a set of data. For example, n0.p0 represents data partition 0, which may be stored in a memory device directly connected to the processing node 0, and n0.p1 represents another data partition, data partition 1 located in the memory device directly connected to the processing node 0 for execution. As illustrated in FIG. 3, the number of data partitions corresponding to each processing node (or located in a memory device directly connected to the processing node) need not be the same. For example, processing node 0 (n0) is provided with two data partitions, p0 and p1; processing node 1 (n1) is provided with two data partitions, p0 and p1; processing node 2 (n2) is provided with three data partitions, p0, p1 and p2; and processing node 3 (n3) is provided with only one data partition, p0.

In operation, each data partition represented by the inner ring 302 is associated with a thread of the outer ring 301, and the data of the respective partition is transmitted to the thread indicated by the outer ring 301 to be processed. In particular, each data partition of the inner ring 302 includes data sub-partitions to be transmitted to different threads in the NUMA system. As the inner ring 302 rotates with respect to the outer ring 301, the data designated to be transmitted to each thread of the outer ring 301 is transmitted to the respective thread when the data partition of the inner ring 302 is aligned with the respective thread of the outer ring 301.

Then, the instruction execution table 300 is shifted to associate the data partitions of the inner ring 302 with a different thread of the outer ring 301. The data sub-partitions in the partitions of the inner ring 302 that are designated to be executed by the newly-associated threads are transmitted to the newly-associated threads to be processed. The process is repeated until each data sub-partition is transmitted to a respective thread, and then new data partitions are provided in the inner ring 302 to be transmitted to the threads of the outer ring 301.

In one embodiment, the data partitions of the inner ring 302 include only operand data, or data that is to be processed by the threads of the outer ring 301. In another embodiment, the data partitions include both operand data and state information of a source thread. In other words, in one embodiment, each source thread processes a sub-partition of data designated to be processed by the source thread. Then, each source thread transmits the remaining sub-partitions and the state information of the thread, including any completed and partially-completed calculations, to a next thread according to the orchestration of the data shuffle. The process is repeated until each sub-partition is processed, and new data partitions are provided in the inner ring 302 for processing.

Figure 4:
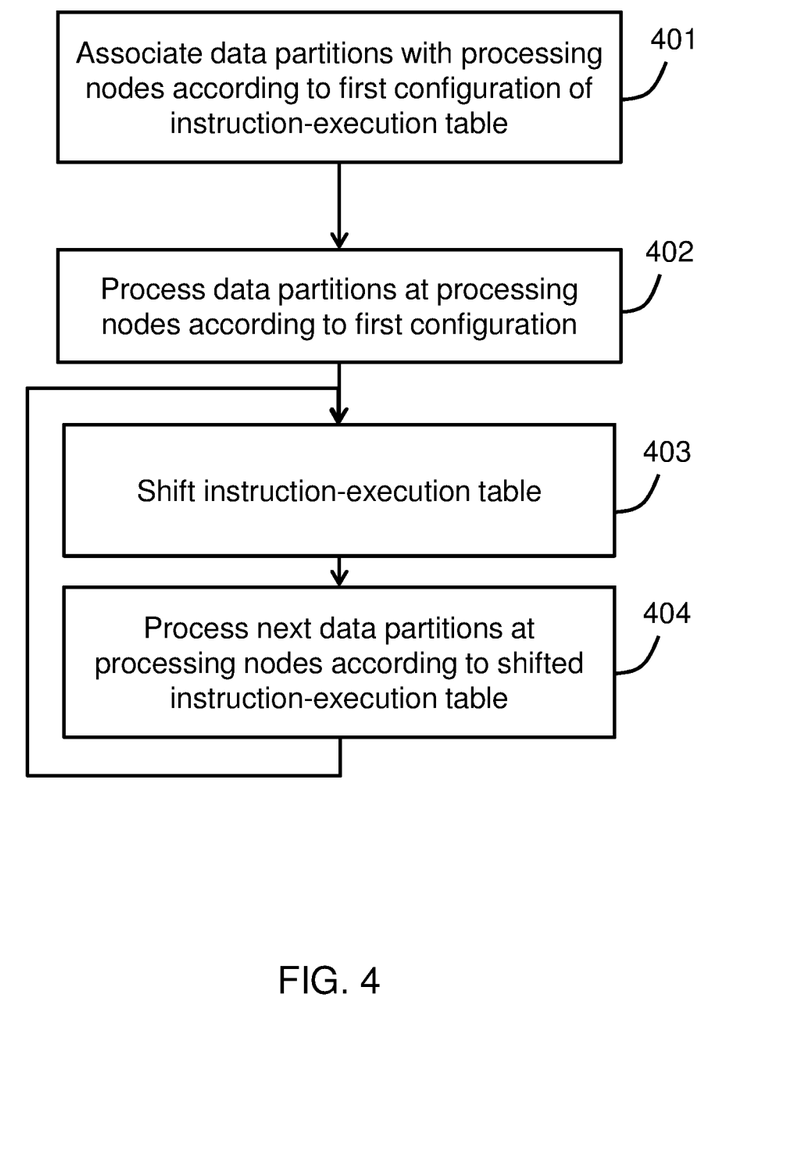
FIG. 4 illustrates a flow diagram of a method according to an embodiment of the invention.

FIG. 4 illustrates a method of data-shifting in a NUMA device or system according to an embodiment of the invention. In block 401, a plurality of data partitions are associated with a plurality of processing nodes according to a first configuration of an instruction-execution table.

In block 402, sub-partitions of the data partitions are processed at the processing nodes according to the table. As discussed above, in embodiments of the invention, data partitions may include any segment of instructions and/or data.

In block 403, the instruction-execution table is shifted to associate the plurality of data partitions with the plurality of processing nodes according to a different configuration than the first configuration. In one embodiment, each data partition is associated with a different processing node than in the first configuration of the instruction-execution table.

In block 404, sub-partitions of the plurality of data partitions are processed at the corresponding processing nodes indicated by the instruction-execution table. The process of shifting the instruction-execution table and processing the data partitions repeats until each data partition has been executed by each processing node.

Figure 5:
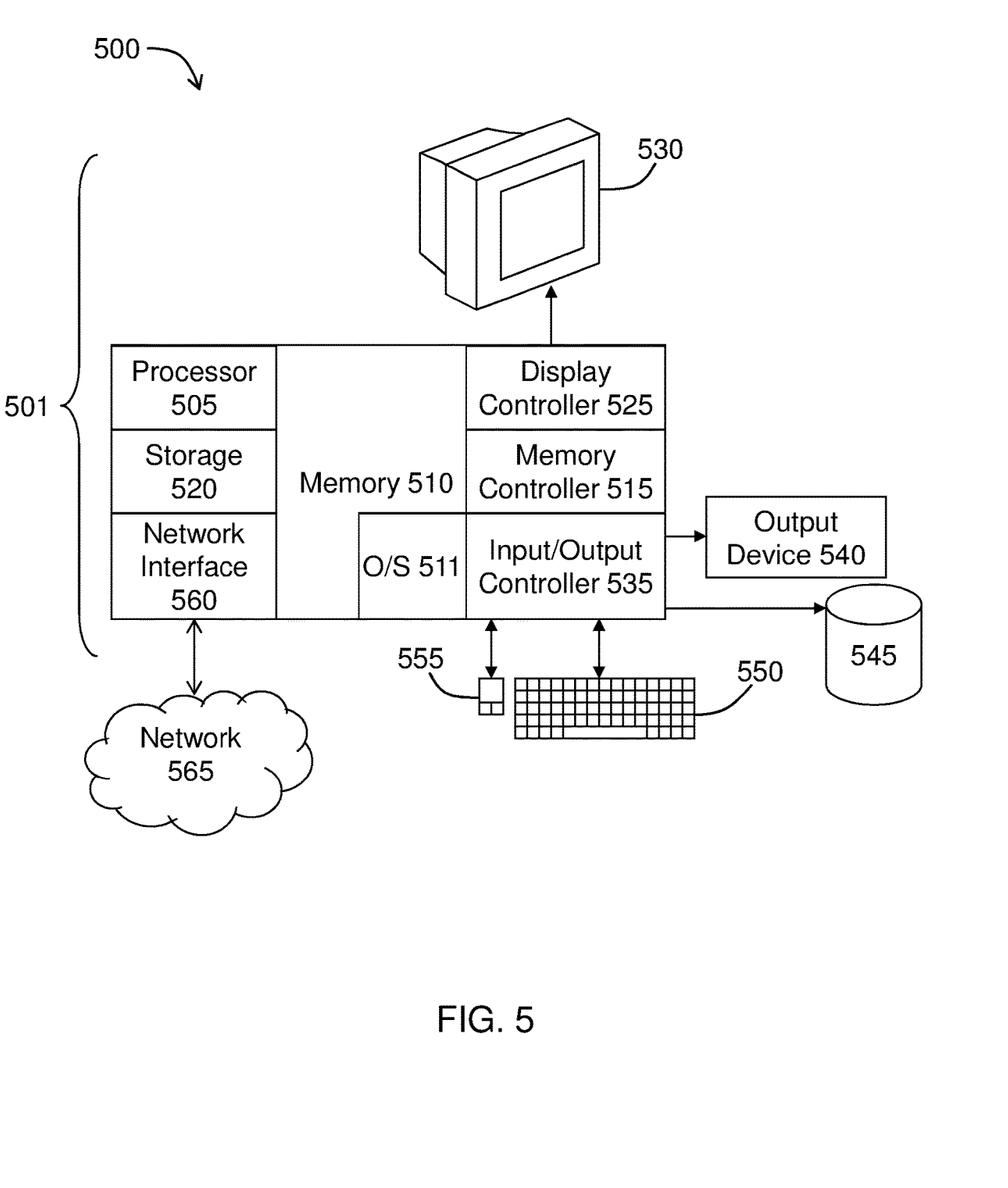
FIG. 5 illustrates a computer system according to an embodiment of the invention.

FIG. 5 illustrates a block diagram of a computer system 500 according to an embodiment of the present disclosure. The methods described herein can be implemented in hardware, software, or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore may include general-purpose computer or mainframe 501.

In an exemplary embodiment, in terms of hardware architecture, as shown in FIG. 5, the computer 501 includes a one or more processors 505, memory 510 coupled to a memory controller 515, and one or more input and/or output (I/O) devices 540, 545 (or peripherals) that are communicatively coupled via a local input/output controller 535. The input/output controller 535 can be, for example, one or more buses or other wired or wireless connections, as is known in the art. The input/output controller 535 may have additional elements, which are omitted for simplicity in description, such as controllers, buffers (caches), drivers, repeaters, and receivers, to enable communications. Further, the local interface may include address, control, and/or interconnects to enable appropriate communications among the aforementioned components. The input/output controller 535 may access the output devices 540 and 545.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (O/S) 511. The operating system 511 essentially controls the execution of other computer programs and provides scheduling, input-output control, file and data management, memory management, and communication control and related services.

In an exemplary embodiment, a conventional keyboard 550 and mouse 555 can be coupled to the input/output controller 535. Other output devices such as the I/O devices 540, 545 may include input devices, for example, but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be any type of network, such as an IP-based network for communication between the computer 501 and any external server, client and the like via a broadband connection, an optical fiber network, or any other type of network.

The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 501 is in operation, the processor 505 is configured to execute instructions stored within the memory 510, to communicate data to and from the memory 510, and to generally control operations of the computer 501 pursuant to the instructions.

In an exemplary embodiment, the methods of orchestrated data shifting in a NUMA device or system described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In embodiments of the present disclosure, the processor 505 includes multiple processing nodes, such as multiple processors and/or multiple processor cores. In addition, the memory 510 includes multiple local memory devices, such that each separate processing node is directly connected to at least one local memory via an interconnect and indirectly connected to at least one other local memory via another processing node. The processes of orchestrated data shuffling of instructions and/or non-instruction data may be performed by the processor 505.

Figure 6:
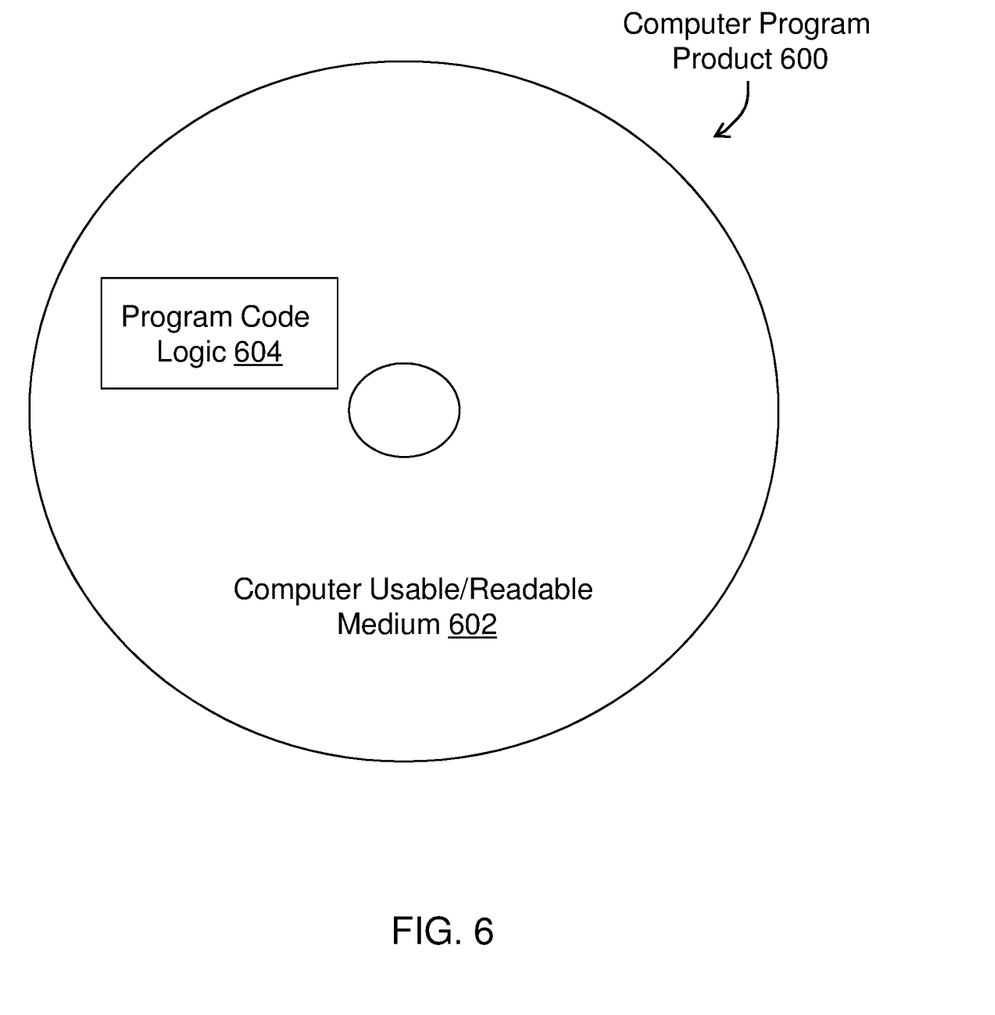
FIG. 6 illustrates a computer-readable medium according to one embodiment of the invention.

As described above, embodiments can be embodied in the form of computer-implemented processes and apparatuses for practicing those processes. An embodiment may include a computer program product 600 as depicted in FIG. 6 on a computer readable/usable medium 602 with computer program code logic 604 containing instructions embodied in tangible and non-transitory media as an article of manufacture. Exemplary articles of manufacture for computer readable/usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the embodiments. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the embodiments. When implemented on a general-purpose microprocessor, the computer program code logic 604 segments configure the microprocessor to create specific logic circuits.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.) executed in hardware, or an embodiment combining software and hardware aspects. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention to the particular embodiments described. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosed embodiments. Many modifications and variations will be apparent to those of ordinary skill in the art without departing from the scope and spirit of the embodiments of the present disclosure.

While preferred embodiments have been described above, it will be understood that those skilled in the art, both now and in the future, may make various improvements and enhancements which fall within the scope of the claims which follow.

What is claimed is:

1. A method of orchestrated shuffling of data in a non-uniform memory access device that includes a plurality of processing nodes, the method comprising:
  running an application on a plurality of threads executing on the plurality of processing nodes, wherein running the application includes dividing data on each thread into partitions according to a target thread on which the data is to be processed;
  identifying, by the threads, data to be shuffled from source threads running on source processing nodes among the processing nodes to target threads running on target processing nodes among the processing nodes;

generating a plan for orchestrating shuffling of the data among the a plurality of memory devices associated with the plurality of processing nodes, the plan including utilizing a data-shifting table to identify an order in which the data partitions are to be transferred from the source threads of the source processing nodes to the target threads of the target processing nodes;

shuffling the data among the plurality of memory devices associated with the plurality of processing nodes based on the plan by transmitting data partitions from the plurality of source threads to the plurality of target threads according to the data-shifting table;

shifting the data-shifting table to associate each source thread with a different target thread; and transmitting another set of data partitions from the plurality of source threads to the plurality of target threads based on shifting the data-shifting table, wherein the data includes operand data and operational state data of the source threads.

2. The method of claim 1, wherein the processing nodes are connected to each other by interconnects, and
the plan includes simultaneously transmitting data over different interconnects to a plurality of different target processing nodes from a plurality of different source processing nodes.

3. The method of claim 1, wherein the data is transmitted simultaneously among the plurality of the processing nodes.

4. The method of claim 1, wherein at least two of the processing nodes are connected to separate local memory devices and to each other, such that each processing node is capable of accessing data from a first local memory device via a direct interconnect and is capable of accessing data from a second local memory device via another processing node.

5. The method of claim 1, wherein the plan for orchestrating the shuffling of data corresponds to a first ring including separate segments for each separate data partition and a second ring located inside the first ring including separate segments for each separate processing node, and
shifting the instruction execution table includes rotating the first ring with respect to the second ring.

6. A non-transitory computer-readable medium having stored therein an instruction-execution table that defines an association of a plurality of data partitions with a plurality of processing nodes, the non-transitory computer-readable medium including instructions that, when executed by one or more processors, controls the one or more processors to perform a method of orchestrated data shuffling, the method comprising:

running an application on a plurality of threads executing on the plurality of processing nodes, wherein running the application includes dividing data on each thread into partitions according to a target thread on which the data is to be processed;

identifying, by the threads, data to be shuffled from source threads running on source processing nodes among the processing nodes to target threads running on target processing nodes among the processing nodes;

generating a plan for orchestrating shuffling of the data among the a plurality of memory devices associated with the plurality of processing nodes, the plan including utilizing a data-shifting table to identify an order in which the data partitions are to be transferred from the source threads of the source processing nodes to the target threads of the target processing nodes;

shuffling the data among the plurality of memory devices associated with the plurality of processing nodes based on the plan by transmitting data partitions from the plurality of source threads to the plurality of target threads according to the data-shifting table;

shifting the data-shifting table to associate each source thread with a different target thread; and transmitting another set of data partitions from the plurality of source threads to the plurality of target threads based on shifting the data-shifting table, wherein the data includes operand data and operational state data of the source threads.

7. The non-transitory computer-readable medium of claim 6, wherein the processing nodes are connected to each other by interconnects, and
the plan includes simultaneously transmitting data over different interconnects to a plurality of different target processing nodes from a plurality of different source processing nodes.

8. The non-transitory computer-readable medium of claim 6, wherein the data is transmitted simultaneously among the plurality of the processing nodes.

9. The non-transitory computer-readable medium of claim 6, wherein at least two of the processing nodes are connected to separate local memory devices and to each other, such that each processing node is capable of accessing data from a first local memory device via a direct interconnect and is capable of accessing data from a second local memory device via another processing node.

10. The non-transitory computer-readable medium of claim 6, wherein the plan for orchestrating the shuffling of data corresponds to a first ring including separate segments for each separate data partition and a second ring located inside the first ring including separate segments for each separate processing node, and
shifting the instruction execution table includes rotating the first ring with respect to the second ring.

11. A non-uniform memory access system, comprising:
a plurality of processing nodes including processing circuitry to execute instructions;
a plurality of local memory modules, at least one local memory module connected directly to at least one first processing node, and the at least one local memory module connected to at least one second processing node only indirectly via the at least one first processing node,
wherein the plurality of processing nodes is configured perform a data-shuffling process, comprising:
running an application on a plurality of threads executing on the plurality of processing nodes, wherein running the application includes dividing the data on each thread into partitions according to a target thread on which the data is to be processed;
identifying, by the threads, data to be shuffled from source threads running on source processing nodes among the processing nodes to target threads running on target processing nodes among the processing nodes;
generating a plan for orchestrating the shuffling of the data among the a plurality of memory devices associated with the plurality of processing nodes, the plan including utilizing a data-shifting table to identify an order in which the data partitions are to be transferred from the source threads of the source processing nodes to the target threads of the target processing nodes;
shuffling the data among the plurality of memory devices associated with the plurality of processing nodes based on the plan by transmitting data partitions from the plurality of source threads to the plurality of target threads according to the data-shifting table;

shifting the data-shifting table to associate each source thread with a different target thread; and transmitting another set of data partitions from the plurality of source threads to the plurality of target threads based on shifting the data-shifting table, wherein the data includes operand data and operational state data of the source threads.

12. The system of claim 11, wherein the processing nodes are connected to each other by interconnects, and the plan includes simultaneously transmitting data over different interconnects to a plurality of different target processing nodes from a plurality of different source processing nodes.

13. The system of claim 11, wherein the data is transmitted simultaneously among the plurality of the processing nodes.

14. The system of claim 11, wherein at least two of the processing nodes are connected to separate local memory devices and to each other, such that each processing node is capable of accessing data from a first local memory device via a direct interconnect and is capable of accessing data from a second local memory device via another processing node.

15. The system of claim 11, wherein the plan for orchestrating the shuffling of data corresponds to a first ring including separate segments for each separate data partition and a second ring located inside the first ring including separate segments for each separate processing node, and shifting the instruction execution table includes rotating the first ring with respect to the second ring.

* * * * *